UNITED STATES PATENT OFFICE.

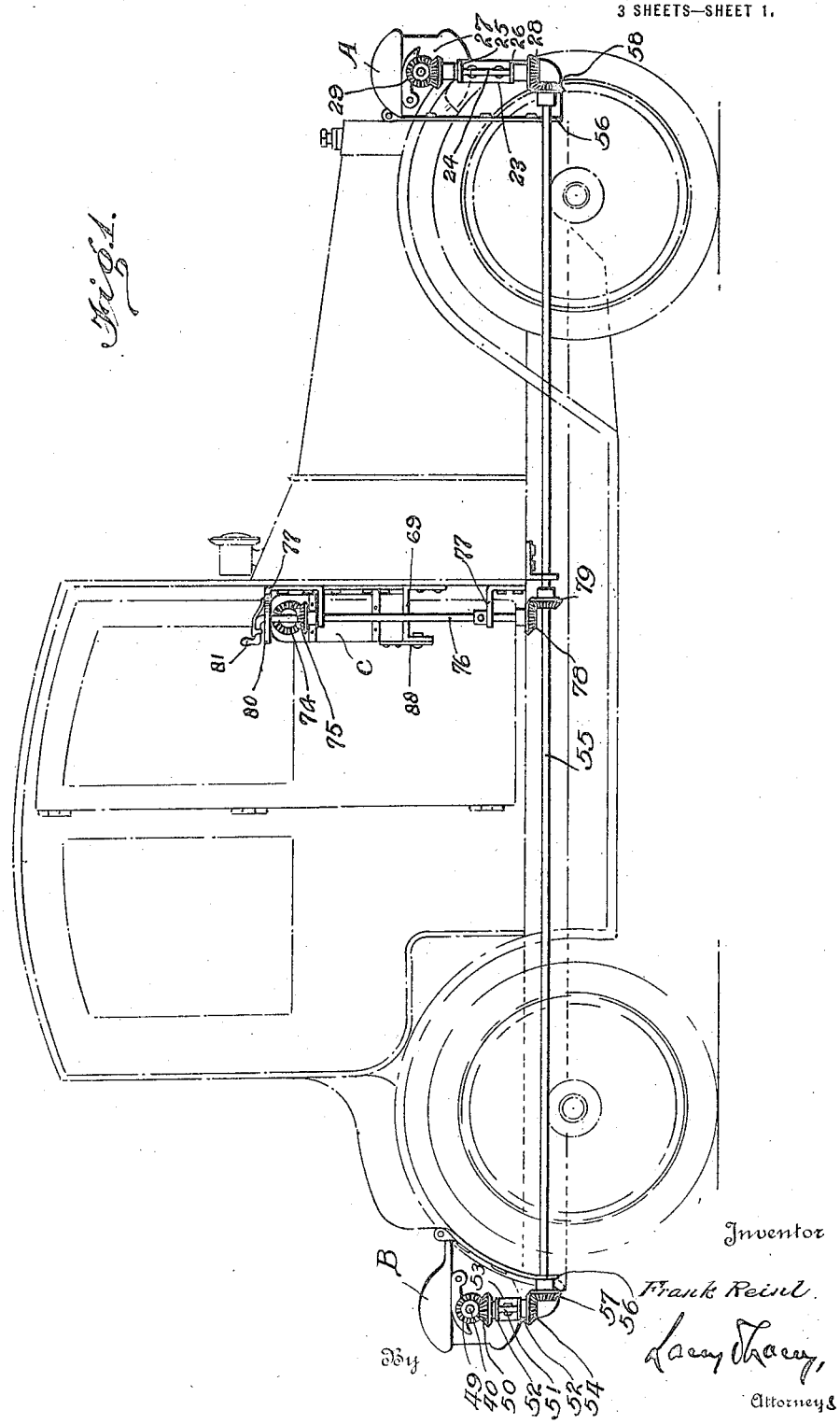

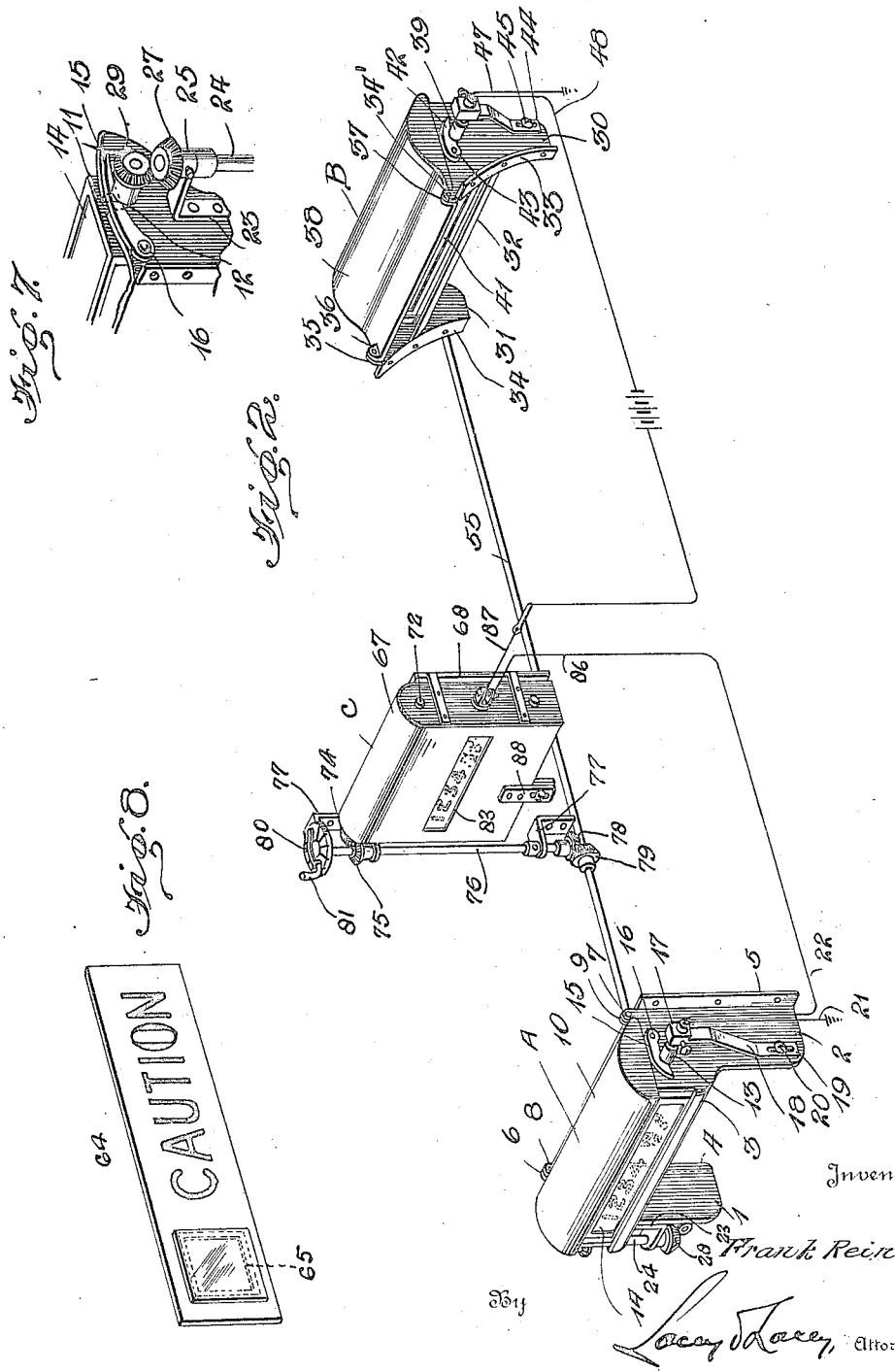

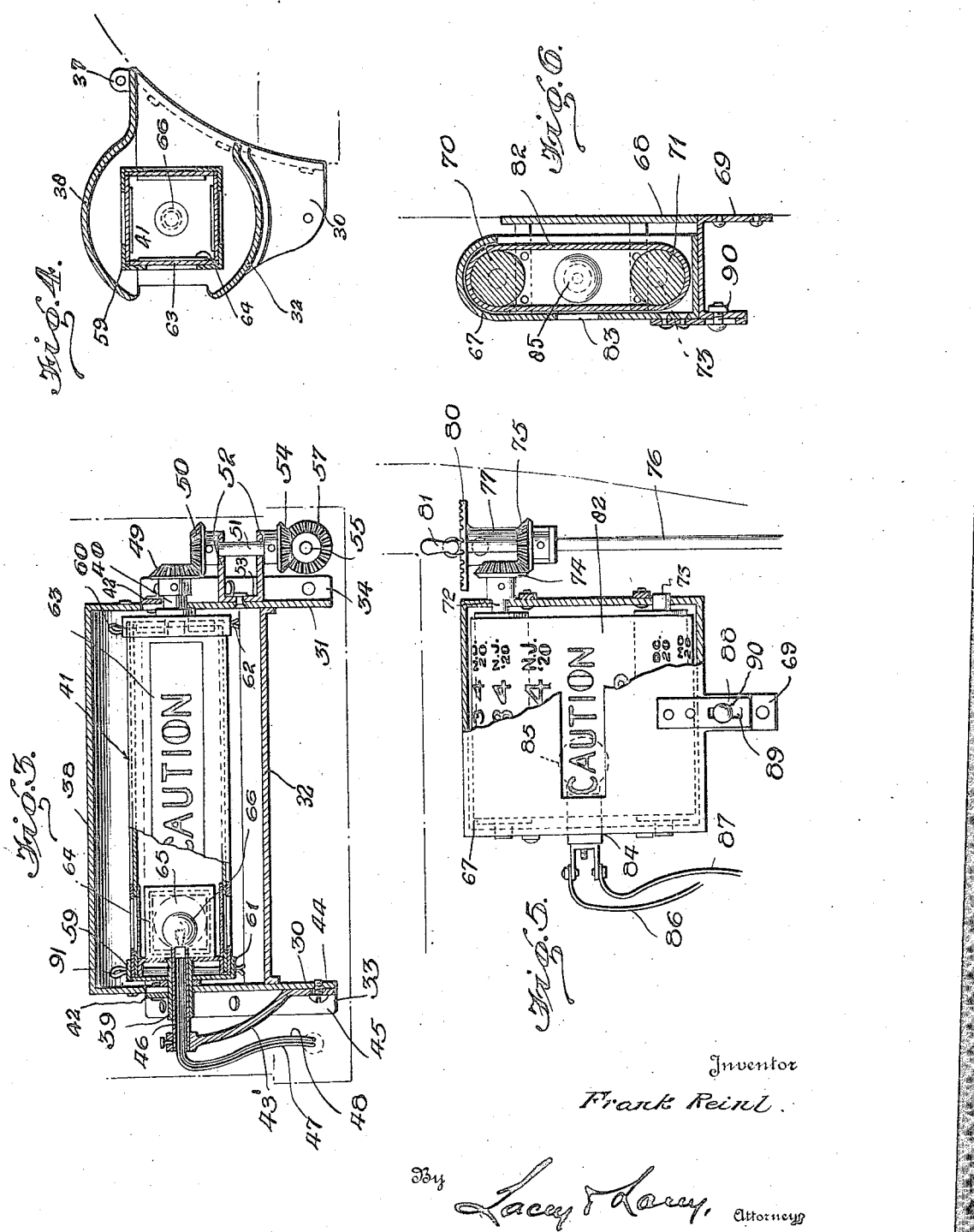

FRANK REINL, OF SECAUCUS, NEW JERSEY.

VEHICLE SIGNAL.

1,419,395.   Specification of Letters Patent.   Patented June 13, 1922.

Application filed March 19, 1920. Serial No. 367,151.

*To all whom it may concern:*

Be it known that I, FRANK REINL, a citizen of the United States, residing at Secaucus, in the county of Hudson and State of New Jersey, have invented certain new and useful Improvements in Vehicle Signals, of which the following is a specification.

This invention relates to a direction indicator and license or registration tag display device for motor vehicles.

An object of the present invention is to provide a device of the above mentioned character which includes display means at the front and rear of the vehicle in combination with display means on the interior of the vehicle for indicating to the driver thereof what particular sign is displayed at the front and rear of the vehicle.

A further object is the provision of means for selectively displaying any pair of a series of pairs of vehicle registration plates so that drivers crossing from one State or territorial boundary into another may change their registration tag without inconvenience and without detaching the same from the vehicle and applying a new tag.

A still further object resides in the provision of mechanically actuated revolving members for displaying selectively one or more signs and which are capable of being actuated by the movement of a single handle from within the interior of the vehicle.

The invention also provides means for illuminating the changeable exhibiting members in such manner that they are clearly visible at night and incorporated in the rear exhibitor is tail light means which is continuously displayed regardless of the changing of the faces of the exhibitor.

In the drawings:

Figure 1 is a side elevation in phantom of a motor vehicle equipped with the present invention;

Figure 2 is a perspective view of the device having the component parts thereof associated in assembled relation but separated from the vehicle;

Fig. 3 is a longitudinal section through the rear changeable exhibitor;

Fig. 4 is a transverse section through the same;

Fig. 5 is a front elevation of the indicating means for the driver with a portion broken away to show details;

Fig. 6 is a transverse section of the device shown in Fig. 5;

Fig. 7 is a detail perspective of one end of the forward changeable exhibitor;

Fig. 8 is a perspective of one of the rear exhibiting faces.

In detail:

The invention comprises a front signal A, a rear signal B and an indicator C mounted within the interior of the vehicle to permit the driver thereof to observe what is displayed by the signals A and B. The construction of these signals and the indicator C will now be described in detail:

The front signal comprises a frame formed of side members 1 and 2 connected by a web 3; said side members 1 and 2 carry flanges 4 and 5 for attaching the signal A to the vehicle. At the top of the side members 1 and 2 are lugs 6 and 7 which are pivoted to similar lugs 8 and 9 of a cover 10 as shown. The side members 1 and 2 are slotted as indicated at 11 to receive the spindle ends 12 and 13 of a rotatable sign carrying element 14, the construction of which will be minutely described later in the specification. The spindle ends are retained in place by latches 15 pivoted as at 16 to form a closure for the slots 11 while the spindle end 13 is supported in a bearing 17 carried by a bracket 18 having a slot 19 engaged by a screw 20 on the side of the frame member 2. Wires 21 and 22 lead into the hollow spindle 13 and are connected with illuminating means such as an incandescent light bulb within the sign carrying element 14, the sign faces of said sign carrying element 14 being transparent so that they may be illuminated at night.

The frame or side member 1 carries a bracket 23 in which a vertical shaft 24 is mounted, said shaft being supported in the bearing portion 25 at the upper end and the bearing portion 26 at the lower end and each end of the vertical shaft 24 carries a bevel pinion as indicated at 27 and 28; also the spindle end 12 carries a bevel pinion 29 meshing with the bevel pinion 27 so that rotary movement of the vertical shaft 24 serves to rotate the pinion 29 to turn up different faces of the sign member 14.

The rear signal comprises the frame members 30 and 31 forming sides connected by the member 32. The side members 30 and 31 have flanges 33 and 34 respectively providing a means for attaching the signal to a vehicle. At the top of the side members 30 and 31 are lugs 34', 35 which are pivoted to similar lugs 36, 37 of a cover 38 as shown. The side members 30, 31 are slotted to receive the spindle ends 39 and 40 of a sign carrying element 41, said spindles being held in position by latches 42 pivoted as at 43 to the side members 30 and 31. The spindle end 39 is supported in a bearing carried by a bracket 43' slotted as at 44 and retained in place by a clamping screw 45, said bearing receiving the fixed member 46 which telescopes the spindle 39 and forms a support for an incandescent lamp socket on the interior of the sign carrying element 41 and receives wires 47 and 48 which furnish current to the incandescent lamp. The spindle 40 carries a bevel pinion 49 meshing with a similar pinion 50 on one end of a vertical shaft 51 which is mounted on the side member 31 and supported in the bearings 52 of a bracket 53 and also carries a bevel pinion 54 at its lower end. A shaft 55 running longitudinally of the vehicle and supported in bearings 56 at each end carries bevel pinions 57 and 58 which mesh with pinions 54 and 28 respectively so that rotational movement of the shaft 55 serves to simultaneously rotate the front and rear signal carrying elements 14 and 41 respectively.

The rotatable signal member 41 of the rear signal B comprises the rectangular end members 59 and 60 carried by the spindles 39 and 40 respectively and which are channeled as indicated at 61 and 62 on all four sides to receive the transparent sign members one of which is clearly shown at 63 and which are nothing but rectangular signs carrying proper designations such as the registration number, "caution," "stop" or the like. The rectangular faces of the sign carrying member 41 have mounted therein the members 64 cut-out as shown at 65 and which cut-out is covered by a red transparency so as to provide a tail light. The tubular member 46 is inserted through the hollow spindle 39 to provide a socket for the incandescent lamp bulb 66 which receives current through the wires 47 and 48.

The construction of the signal element 14 of the forward signal device A is identical with that previously described with the exception of the tail light construction and hence it is believed that no detailed description thereof is necessary.

The driver's indicator comprises a casing 67 having brackets 68 and 69 for mounting it at any suitable location within the vehicle and encloses rollers 70 and 71 carried on spindles 72 and 73, the former of which carries a bevel gear 74 meshing with a bevel gear 75 carried on a vertical shaft 76 mounted in brackets 77, and the lower end of which shaft 76 carries a bevel gear 78, meshing with a bevel gear 79 carried on the shaft 55. The upper end of the upper bracket 77 is turned at right angles to provide a dial 80 notched for different positions of a lever 81 carried by the upper end of the shaft 76. By this construction it will be seen that movement of the lever 81 to different positions will move the shaft 76, the spindle 72 carrying the bevel gear 74 and roller 70 and also the signal elements 14 and 41 of the front and rear signal devices A and B. In order to indicate to the driver of the vehicle what combination of signal faces is displayed at the front and rear of the vehicle a web 82 is carried by the rolls 70 and 71 and is provided with spaced signs bearing the same data as is displayed on the various sign faces to be used in the signal members A and B. Therefore, by turning the handle 81 the driver of the vehicle may bring into view through the aperture 83 the sign face which he desires to display at the front and rear of the vehicle.

To provide for night driving a socket 84 may be incorporated in the casing 67 for the purpose of mounting an incandescent light bulb 85 which is fed through wires 86, 87 from a suitable source of electrical energy. A suitable bracket 88 slotted as at 89 is secured to the front of the casing 67 and connected by a bolt 90 with the bracket 69 so as to provide for vertical adjustment of the casing 67 to properly mesh the bevel pinion 74 with the bevel pinion 75.

The construction of the signal element in the case of each signaling device is such that one end thereof may be removed for the purpose of changing the sign faces. To this end the pins 91 are provided to hold the end 59 in position.

If desirable, sign elements having only two faces and non-transparent may be provided, or sign elements having only two transparent faces may likewise be provided for interchanging with the sign elements shown in the drawings.

I claim:

In a vehicle indicator, the combination of a casing comprising side plates provided with notches in their upper ends and each provided along one edge with means for attachment to a vehicle, and a web connecting the side plates below the upper ends thereof, the entire space between the side plates above the web being open, a cover hinged to and extending over the upper ends of the side plates and closing the notches therein, a rotatable display member disposed between the side plates above the web and visible between the web and the cover, spindles at the ends of the display member fitting in the notches in the upper ends of the side plates, means on the side plates to detachably retain the spindles in the notches, a shaft mounted exteriorly on one side plate, gearing connecting one end of said shaft with the spindle at the adjacent end of the display member, and means acting on the opposite end of the shaft for operating the same.

In testimony whereof I affix my signature.

FRANK REINL. [L. S.]